United States Patent [19]
Bauer et al.

[11] Patent Number: 5,401,693
[45] Date of Patent: Mar. 28, 1995

[54] GLASS FIBER COMPOSITION WITH IMPROVED BIOSOLUBILITY

[75] Inventors: Jon F. Bauer, Castle Rock; Kevin D. Schaal, Littleton, both of Colo.

[73] Assignee: Schuller International, Inc., Denver, Colo.

[21] Appl. No.: 947,327

[22] Filed: Sep. 18, 1992

[51] Int. Cl.⁶ .............................. C03C 13/02
[52] U.S. Cl. ........................ 501/38; 501/36; 501/35; 501/70; 501/72; 501/65; 501/67
[58] Field of Search ............. 65/2; 501/38, 36, 39, 501/70, 72, 65, 67

[56] References Cited

U.S. PATENT DOCUMENTS

| | | | |
|---|---|---|---|
| 2,051,279 | 8/1936 | Thorndyke | 501/36 |
| 2,155,107 | 4/1939 | Tyler | 65/2 |
| 2,428,810 | 10/1947 | Powell | 65/2 |
| 2,520,168 | 8/1950 | Powell | 65/2 |
| 2,520,169 | 8/1950 | Powell | 18/2.6 |
| 2,576,312 | 11/1951 | Minnick | 501/36 |
| 2,577,431 | 12/1951 | Powell | 65/2 |
| 2,823,416 | 2/1958 | Powell | 65/2 |
| 3,508,939 | 4/1970 | Laurent et al. | 501/70 |
| 3,853,569 | 12/1974 | Laurent | 501/38 |
| 4,036,654 | 7/1977 | Yale | 501/36 |
| 4,153,439 | 5/1979 | Tonic et al. | 65/2 |
| 4,238,213 | 12/1980 | Pallo et al. | 65/8 |
| 4,342,581 | 8/1982 | Newbauer et al. | 65/4.4 |
| 4,351,054 | 9/1982 | Olds | 373/38 |
| 4,366,251 | 12/1982 | Rapp | 501/36 |

(List continued on next page.)

FOREIGN PATENT DOCUMENTS

| | | |
|---|---|---|
| 255803 | 7/1963 | Australia . |
| 588493 | 12/1959 | Canada . |
| 1193290 | 9/1985 | Canada . |
| 2017344 | 11/1990 | Canada . |
| 2022446 | 2/1991 | Canada . |
| 076677 | 4/1983 | European Pat. Off. . |
| 399320 | 11/1990 | European Pat. Off. . |
| 1165275 | 10/1958 | France . |
| 1589410 | 5/1970 | France . |
| 1942991 | 3/1970 | Germany . |
| 520247 | 4/1940 | United Kingdom . |

(List continued on next page.)

OTHER PUBLICATIONS

Original Paper: "Glass Fiber Dissolution in a Physiological Saline Solution", Russell M. Potter and Stephanie M. Mattson, Glastechnische Berichte, vol. 64, No. 1, Jan. 1991, Frankfurt, Germany.

*Elements of Ceramics*, F. H. Norton, Addison-Wesley Publishing Company, Inc., Reading, Mass. (1952), No month.

"Preparation and Properties of Barium Ferrite Using Hot-Rolled Mill Scale", Yung Tsen Chen; Hong-Chih Pan; Yung-Chao Ko, China Steel Corp., Kaohsiung, Taiwan, J. Arm, Ceram. Soc. 72 (8) 1328 (1989), No month.

Chemical Abstracts, vol. 89, No. 22, 27 Nov. 1978 Columbus, Ohio p. 285, Ab. #184615w.

Chemical Abstracts, vol. 81, No. 22, 2 Dec. 1974 Columbus, Ohio p. 241, Ab. #1400672.

"A Scale of Acidity and Basicity in Glass", by Kuan Han Sun, Glass Industry, Feb. 1948 pp. 73–74.

(List continued on next page.)

*Primary Examiner*—Mark L. Bell
*Assistant Examiner*—C. M. Bonner
*Attorney, Agent, or Firm*—Cornelius P. Quinn

[57] ABSTRACT

Described is an inorganic fiber comprising silica dioxide, calcium oxide, and alkali oxide having a free energy of hydration greater than (more positive than) −5.00 kcal/mol, an enthalpy of formation less than (more than negative than) −210.0 kcal/mol, a dissolution rate in simulated extra cellular fluid greater than 750 (calculated as nanograms of fiber/per square centimeter of fiber surface area/per hour) having an average fiber diameter not greater than 4.5 micrometers. Also described is a method of manufacturing the fibers.

2 Claims, 2 Drawing Sheets

U.S. PATENT DOCUMENTS

| | | | |
|---|---|---|---|
| 4,437,192 | 3/1984 | Fujia et al. | 501/67 |
| 4,454,238 | 6/1984 | Hobson et al. | 501/38 |
| 4,661,134 | 4/1987 | Wartung | 65/6 |
| 4,693,740 | 9/1987 | Noiret et al. | 65/135 |
| 4,882,302 | 11/1989 | Worincki | 501/27 |
| 5,055,428 | 10/1991 | Porter | 501/35 |
| 5,108,957 | 4/1992 | Cohen et al. | 501/35 |

FOREIGN PATENT DOCUMENTS

| | | | |
|---|---|---|---|
| 810773 | 3/1959 | United Kingdom . | |
| 811243 | 4/1959 | United Kingdom | 501/38 |
| 1209244 | 10/1970 | United Kingdom . | |
| 1446910 | 8/1976 | United Kingdom . | |
| 2083017 | 3/1982 | United Kingdom . | |
| 2122537 | 1/1984 | United Kingdom . | |
| 607807 | 5/1978 | U.S.S.R. . | |
| 8502394 | 6/1985 | WIPO . | |
| 8912032 | 12/1989 | WIPO . | |

OTHER PUBLICATIONS

"Criteria Involved in the Prediction of Spinability of Mineral Wool Melts", by Schubert PHI Harper; D. Barham, *Journal of The Canadian Ceramic Society*, vol. 48 (1979) pp. 17–22.

"Fiber Toxicology", J. P. Leinweber, Ph.D., *Journal of Occupational Medicine*, vol. 23, No. 6, pp. 431–434 (Jun., 1981).

"Man–Made Vitreous Fibers: An Overview of Studies on Their Biological Effects", Paul Gross, M.D., *American Industrial Hygiene Association*, J. 47(II), pp. 717–723(Nov. 1986).

"Measurement of In Vitro Dissolution of Aerosol Particles For Comparison to In Vivo Dissolution in the Lower Respiratory Tract After Inhalation", G. M. Kanapilly, etc., *Health Physics*, vol. 24, pp. 497–507 (May, 1973).

"The Influence of Varying Lengths of Glass and Asbestos Fibres on Tissue Response in Guinea Pigs", G. W. Wright and M. Kuschner, *Inhaled Particles IV*, pp. 455–473 (1977), No month.

"Pathogenicity of MMMF and the Contrasts with Natural Fibres", D. M. Bernstein, etc., *Proc. 1982 WHO-/IARC Conf.*, Copenhagen, vol. 2, pp. 169–195 (1984).

"Diffusion–Controlled Reaction of Water with Glass", R. H. Doremus, *Journal of Non–Crystalline Solids 55*, pp. 143–147 (1983). No month.

"Regulation of Intracytoplasmic pH and 'Apparent' Intracellualar pH in Alveolar Macrophages", David Laman, etc., *Experimental Lung Research 2*, pp. 141–153 (1981), No month.

"The Dissolution of Asbestos Fibres in Water", Janet R. Gronow, *Clay Minerals 22*, pp. 21–35 (1987), No month.

"The Corrosion Phenomena in Glass Fibers and Glas Fiber Reinforced Thermosetting Resins", A. Bledski, etc., *Composites Science and Technology 23*, pp. 263–285 (1985), No month.

"Effects of Glass Surface Area to Solution Volume Ratio on Glass Corrosion", E. C. Ethridge, etc., *Physics and Chemistry of Glasses*, vol. 20, No. 2, pp. 35–40 (Apr., 1979).

"Chemical Kinetics of Water–Rock Interactions", Antonio C. Lasaga, *Journal of Geophysical Research*, vol. 89, No. b6, pp. 4009–4025 (Jun., 1984).

"Rate Control of Mineral Dissolution Under Earth Surface Conditions", Robert A. Berner, *American Journal of Science*, vol. 278, pp. 1235–1252 (Nov., 1978).

"Dissolution Kinetics of Magnesium Silicates", Robert W. Luce, etc., *Geochimica et Cosmochimica Acta*, vol. 36, pp. 35–50 (1972).

"Solubility of Asbestos and Man–Made Fibers in Vitro and in Vivo: Its Significance in Lung Disease", A. Morgan and A. Holmes, *Environmental Research 39*, pp. 475–484 (1986), No month.

"On the Problem of Measuring and Analysis of Chemically Changed Mineral Fibers in the Environment and in Biological Materials", K. R. Spurny, *The Science of the Total Environment*, pp. 239–249 (1982), No month.

"Chemical Durability of Asbestos and of Man–Made Mineral Fibres in Vivo" by B. Bellman *Aerosol Scientist*, vol. 17, No. 3, pp. 341–345 (1986).

"The Behavior of Mineral Fibres in Physiological Solutions" by H. Forster, et al, in *1982 WHO/IARC Conference, Copenhagen*, vol. 2, pp. 27–55 (1984).

"In–Vitro Study on Siliceous Fibres" by H. Scholze, et al, Proceedings *1986 WHO/IARC Conference, Copenhagen*. No month.

GLASS FIBER COMPOSITION WITH IMPROVED BIOSOLUBILITY

TECHNICAL FIELD

The present invention is concerned with inorganic glass fiber compositions having improved biosolubility which utilizes silica and calcia compositions.

BACKGROUND ART

Many fiberglass compositions are currently under development that have improved biosolubility over asbestos fibers and other strongly stable inorganic compositions. The difficulty with many of the compositions that are prepared is that the manufacturing of such fibers may be difficult to control. In addition, the quality product characteristics needed for glass fibers such as the ability to withstand high temperature and moisture environments, yet at the same time to have a desirable biosolubility, may be lacking.

U.S. Pat. No. 4,036,654 to Yale et al. describes glass fiber compositions with a high alkali resistance comprising silica, zirconia from 6 to 20%, as well as high calcia content of from 20 to 45%.

Canadian patent application No. 2,022,446 is directed to a composition of glass fibers which can dissolve in a physiological environment. Preferred components of the composition are silicon dioxide, aluminum oxide, calcium oxide, magnesium oxide, sodium oxide, boron oxide and $P_2O_5$. Good performance characteristics are not expected of these fiberglass compositions.

Canadian application No. 2,017,344 has as preferred compositions silicon dioxide, boron oxide, and sodium oxide. The performance characteristics of such glass fibers is sacrificed for high physiological solubility.

International Publication Application No. PCT/US89/02288, published Dec. 14, 1989 as Publication No. WO89/12032, describes inorganic fibers having a silicon extraction rate greater than 0.02 weight percent silicon per day in physiological saline solution. The publication discloses glass fibers comprising silica, magnesia, calcium oxide, alumina and other oxides which have low durabilities in physiological saline solutions.

It is an object of the present invention to describe a glass fiber composition that has high physiological biosolubility.

It is also an object of the present invention to have high biosoluble glass fibers which have high strength and moisture resistance for use in filtration and insulation product applications.

It is a further object of the present invention to have high biosoluble glass fiber compositions that have a free energy of hydration greater than (more positive than) −5.00 kilocalories (kcal) per mole.

SUMMARY OF THE INVENTION

Described is an inorganic fiber comprising silicon dioxide, calcium oxide, and alkali oxide having a free energy of hydration greater than (more positive than) −5.00 kcal/mol, a free energy of formation less than (more than negative than) −210.0 kcal/mol, a dissolution rate in simulated extra cellular fluid greater than 750 (calculated as nanograms of fiber/per square centimeter of fiber surface area/per hour) and having an average fiber diameter not greater than 4.5 micrometers.

DESCRIPTION OF PREFERRED EMBODIMENTS

In the preparation of a desirable biosoluble inorganic glass fiber, one needs to take into account not only the biosolubility of the glass fiber, but also its heat of formation and its Gibbs free energy ($\Delta G$) of hydration.

Use of glass fiber products in applications such as high efficiency thermal and acoustical insulations and air and liquid filtration media require that the diameters of the constituent fibers be rather fine—with diameters small enough to make them potentially respirable to humans, if indeed, during manufacture or use, an airborne component were present. If respired, the potential for such fibers to induce respiratory disease has been correlated with (1) the dose of fiber received, (2) the dimension of the fiber in the dose, and (3) the persistence of the fiber in the lung—the latter a function, in major part, of its chemical and physical durability in that particular environment.

Given the above uncertainties, it has become increasingly important to continue to search for new compositions and even physical property changes that would allow such fibers to be less durable in the body than present formulations, but still retain the strength and fatigue properties and overall environmental durability that would allow them to continue to serve as useful products in the applications noted above. This has not been easy, as many of the mechanisms which allow enhanced "biodegradation" also control strength and fatigue properties, particularly in the presence of atmospheric moisture—the most common agent responsible for environmental deterioration of glass fiber products.

This invention discloses a solution to this problem. In specific, it discloses a series of useful new biosoluble glass compositions, that may be readily melted and formed into fibers by conventional (known) glass fiberization processes, and that are easily degradable in synthetic body fluid simulants. These compositions may be employed to produce fibers with diameters as small as 0.1 $\mu m$. They are deemed useful in that they will result in fibers with strength and moisture resistance properties sufficient for use in glass fiber wool, blanket, batt, mat and paper products for applications noted above.

Correlation of glass durability with composition has been attempted for many years. Both qualitative (phenomenological) and statistical data exist and can be useful to the glass chemist in developing product formulations. One cut more fundamental, however, are models which attempt to correlate glass durability or dissolution behavior with thermochemical or structural chemical data that more quantitatively reflect the difficulty with which a glass can be broken down into its components or produce reaction products in a given aqueous environment. These models rely on thermodynamic data such as heats of formation and free energies of hydration and some concept of glass structure, such as degree of polymerization, to provide explanations of durability behavior. Most have been developed for the reaction of bulk glass with water (perhaps the simplest and most relevant medium), and have done remarkably well in a broad sense, in explaining corrosion and dissolution of many conventional glasses and, more recently, glasses developed for encapsulation of nuclear waste materials.

The models require, however, that a glass be represented as a composite of individual components or "building blocks" to each of which are assigned known thermodynamic or structural-chemical values. As will be shown later, the choice of these "building blocks" can be quite important. The simplest representation is that of a glass comprised of simple known oxides—$SiO_2$, $Al_2O_3$, $Na_2O$, and the like. More complex models look at building the glass from various oligomers such as aluminosilicate units. The key is that appropriate thermodynamic or other parameters must exist for each unit and that they may be combined with some assumptions as to their mixing behavior into a representation of the glass as a whole. Support for the latter approach comes from relatively recent work involving Raman spectroscopy and solid state nuclear magnetic resonance which depict the glass more as a composite of individual rings, chains and other silicate oligomers, rather than just a random network.

Perhaps the most well known models of these types were developed by Paul, A., CHEMISTRY OF GLASSES, (Chapman and Hall, New York)(1982) and Paul, A., J. MAT. SCI. 12, pp. 2246–2268 (1977) who explained silicate glass durability on the basis of Gibbs free energies of hydration of oxide and silicate components. Underlying the Paul theories was the concept that silicate glasses consisted of network forming components and network modifying components, conventional network formers being $SiO_2$, $B_2O_3$, and often $Al_2O_3$ and $Fe_2O_3$. Network modifiers included the monovalent and divalent alkali and alkaline earth oxides and transition metal oxides. In aqueous solution at pH values below about 8, network formers were believed to break down primarily by nucleophilic attach of water molecules resulting in the formation of hydrous phases that either can be stable in solution or remain in a residual gel or leached layer. For the silica component, this may be expressed as:

$$SiO_2(vitr.) + H_2O = H_2SiO_3.$$

Breakdown of metasilicic acid (to form  or $SiO_3{}^{2-}$) increases markedly above a pH of about 8.5 and, hence, represents the driving force for the well-known breakdown of most glasses at high pH. Network modifying components ($Na_2O$, $CaO$, $K_2O$, and the like) were believed to be dissolved from the glass primarily by ion exchange reactions with protons or hydronium ions in solution, e.g., $Na_2SiO_3 + 2H+ = H_2SiO_3 + 2Na+$ where the modifying component was represented as a silicate rather than a simpler pure oxide. The net result of both processes resulted in the removal of silica from the glass. The overall generalized reaction sequence may then be depicted as:

Glass + water (hydronium ions) → Glass "hydrates" + cations (aqueous)  (1)

where the term "hydrates" refers primarily to the hydroxides and hydroxy complexes that typically comprise hydration products of the network forming components. Both of the above reaction types could be represented thermodynamically by a known equilibrium constant K and its corresponding free energy of reaction, related by the well-known expression:

$$K = \exp(-\Delta G°(hydr.)/RT) \quad (2)$$

where $\Delta G°$ (hydr.) refers to the free energy of hydration (or ion exchange), T the absolute temperature and R, the gas constant. Durability of the glass could then be represented by the sums of the free energies of hydration for each of these components multiplied by their mole fraction in the glass or $$\Delta G°(\text{hydration, glass}) = \Sigma \Delta G°(hydr.)_i X_i \quad (3)$$

where $\Delta G°$ (hydr.)$_i$ represents the hydration energy of the ith component in the glass and $X_i$ its corresponding mole fraction. The more negative the total free energy of hydration, the poorer the durability of the glass in aqueous media became. Paul, A., CHEMISTRY OF GLASSES, (Chapman and Hall, New York)(1982) and Paul, A., J. MAT. SCI. 12, pp. 2246–2268 (1977) was able to support these simple models by experimental results which agreed pretty well with calculated durabilities based on hydration theory.

In the strict sense, Paul's hydration theory may apply only to equilibrium conditions at a standard state of 25° C. and 1 atm. At these conditions, the quantity of "glass" dissolved in solution or of a particular component (e.g. silica) should be related in a log-linear sense (eq. 1) by the mass action laws so that a plot of in ($H_2SiO_3$) vs. $\Delta G°$ (hydration), for example, for various glass types should be linear and be able therefore to provide a quantitative measure of durability. Measurement of $H_2SiO_3$ may be obtained from ICP or AA analysis for Si or, if dissolution is congruent, total mass loss may be used in its place.

Dissolution, however, whether of a fiber in the body or on the surface of a glass fiber in contact with a thin film of water, is seldom felt to occur under equilibrium, or even standard state conditions and a more appropriate expression of this process might be (4)

where Q is an activity product for the glass (actually, the sum of the activity products for each glass component) in solution at any given time. The ratio Q/K is in effect a measure of disequilibrium, often termed the affinity for dissolution; as Q approaches K (ratio approaches 1) dissolution will approach equilibrium and activities approach equilibrium solubilities for each component. Dissolution affinities represent the driving force for the process and may thereby be directly correlated with observed dissolution rates (see Bourcier, W. L., GEOCHEMICAL MODELLING OF RADIOACTIVE WASTE GLASS DISSOLUTION USING EQ3/6, Lawrence Livermore National Laboratory, UCID—21869 (1990); and Bourcier, W. L., Peiffer, D. W., Knauss, K. G., McKeegan, K. D. and Smith, D. K., MATERIALS RESEARCH SOCIETY SYMP. PROC., 176, pp. 209–216 (1990)). Notice that $\Delta G_{T,P}$ (hydration) is not constant under non-equilibrium conditions and precise determination of this value would require continuous monitoring of change in solution chemistry (Q) with time.

If a rigorous calculation of dissolution rates or dissolution profiles were required, an integrated value of $\Delta G_{T,P}$ (hydration) or dissolution affinity would be needed (e.g., Grambow, B., in SCIENTIFIC BASIS FOR NUCLEAR WASTE MANAGEMENT VIII, MATERIALS RESEARCH SOCIETY SYMP. PROC. 44, pp. 15-27 (1985); Bourcier, et al., MATERIALS RESEARCH SOCIETY SYMP. PROC., 176, pp. 209-216 (1990). However, if a reasonably effective model for relative ranking of glass dissolution based on component chemistries is more the target, the $\Delta G_{T,P}$ (hydration) may be adequately approximated by the Paul model. Successful applications have been demonstrated by Jantzen, C. M. and Plodinec, M. J., J. NON CRYST. SOLIDS 67, pp. 207-223 (1984); and Abrajano, T. A., Bates, J. K., and Bohlke, J. K. in MATERIALS STABILITY AND ENVIRONMENTAL DEGRADATION (Materials Research Society, Pittsburgh), pp. 383-392 (1988).

Since the net free energy of hydration for the reaction glass with aqueous media reflects to a large degree the energies required to break chemical bonds within the glass and recovered in the formation of new ones within a collection of hydroxides or hydrated ionic species, it should serve as a pretty good predictor of what actually occurs during the dissolution process, even though it may be difficult to use the values directly in actual rate calculations. Models of this type are often referred to as structural-chemical or linear free energy kinetic models as they attempt to predict kinetics (reaction rates) on the basis of calculable parameters that approximate or in a relative or proportional way reflect the free energy of activation, $\Delta G^*$, of the process. Thus the relationship expressed by the Paul model $$\ln r(\text{glass}) = k(\Delta G° \text{ hydration}) + k' \quad (5)$$

should be valid if $\Delta G°$ (hydration) serves well as a surrogate for $\Delta G^*$ as it appears to have been in the applications noted above. In this expression, r represents the leach rate of the glass, expressed either as a quantity of a known component in the leachate over a fixed period of time or integrated mass loss (if assumed congruent) over a fixed period of time. $\Delta G°$ hydration is derived per equation (3). This value must be normalized to both the reacting surface area of the glass (or fiber in the case of man-made vitreous fibers (MMVF)) and, if a component, to the mass fraction of that component in the original glass. k and k' are constants. Calculation of $\Delta G°$ hydration should then yield a prediction of r which can be validated by plotting against experimentally-determined values of r for several glass (fiber) compositions.

$\Delta G°$ (hydration) is actually not only the thermochemical or structural chemical value that has been or can be used to predict durability or dissolution rates of glass. Others that have been used include the enthalpy of formation of the glass (derived from a summation of component enthalpies as in the Paul model)— an approximate measure of the mean bond strength of the glass, and the ratio of bridging to non bridging oxygens in the glass structure—a measure of its degree of polymerization. The former has been employed here as well in the prediction of MMVF durability.

It is to be appreciated that normal glass fiber manufacturing capabilities are to be utilized. While not a complete listing of glass fiber manufacturing techniques, some of the fiberization manufacturing techniques can be described as the hot marble process or the hot air blown process, and the like. In such cases, the glass melt is formed and the glass is passed through spinnerettes whereby air is blown onto the melted glass as it comes through the spinnerettes, thereby forming the glass fiber. Glass fibers can be formed from a melted fraction channeled down a V-shaped trough. Fiberization occurs by steam application through jets at the bottom of a trough; also a steam-blown process may be utilized. This is a technique of blasting steam jets onto downward flowing, free streams of melted vitreous material. A flame attenuation process utilizes a technique whereby the fibers are formed from primary filaments. High speed spinning processes likewise can be utilized to form glass fibers. A rotary process likewise may be used. See the book "Glass Fibers" by J. Gilbert Mohr and William P. Rowe, VAN NOSTRAND, REINHOLD CO., published in 1978. The book describes numerous fiberizing techniques at pages 4-16, hereby incorporated by reference.

Desirable composition for glass fibers disclosed herein with the desirable biosoluble properties include the following:

| Materials | Range | Preferred Range |
| --- | --- | --- |
| Silicon dioxide | 50-70 mole % | 55-67 mole % |
| Calcium oxide | 3-20 mole % | 5-13 mole % |
| Alkali oxide | 5-20 mole % | 8-15 mole % |
| Boron oxide | 3-15 mole % | 5-13 mole % |
| Zirconia oxide | 0.1-5 mole % | 1-2 mole % |
| Aluminum oxide | 0-2 mole % | 0-2 mole % |

In order to ascertain enthalpies of formation and free energies of hydration, over 60 fiber formulations were prepared. The formulations lay within the following range:

TABLE 1

| | (in mole % oxide) |
| --- | --- |
| $SiO_2$ | 58-68 |
| $Al_2O_3$ | 0-4 |
| $Fe_2O_3$ | 0-3 |
| $TiO_2$ | 0-2 |
| $ZrO_2$ | 0-3.5 |
| CaO | 0-21 |
| MgO | 0-13 |
| BaO | 0-2.5 |
| ZnO | 0-3.5 |
| $Na_2O$ | 8-18 |
| $K_2O$ | 0-2.5 |
| $Li_2O$ | 0-2 |
| $B_2O_3$ | 4.5-11 |
| $P_2O_5$ | 0-1.5 |
| $F_2$ | 0-15 |

For illustration, some specific examples are provided below:

TABLE 2

| | 1 | 2 | 3 | 5X | 6X | 7X |
| --- | --- | --- | --- | --- | --- | --- |
| $SiO_2$ | 58.2 | 64.9 | 57.1 | 60.0 | 59.5 | 63.2 |
| $Al_2O_3$ | 3.1 | 2.9 | 2.1 | 1.0 | 1.1 | 0.9 |
| CaO | 8.1 | 5.5 | 12.5 | 11.0 | 11.2 | 9.9 |
| MgO | 6.2 | 4.4 | 0.7 | 4.0 | 4.0 | 3.0 |
| ZnO | — | — | 1.2 | — | — | — |
| BaO | — | — | — | — | 0.8 | — |
| $Na_2O$ | 14.7 | 15.6 | 16.9 | 13.2 | 11.1 | 11.0 |
| $K_2O$ | 0.7 | 0.7 | 0.5 | 0.8 | 2.0 | 1.0 |
| $B_2O_3$ | 7.6 | 4.7 | 9.0 | 8.8 | 9.0 | 10.9 |
| $ZrO_2$ | — | — | — | 1.2 | 1.3 | 0.1 |

The calculation for enthalpy of formation proceeds as follows:

First, the glass composition is recast in terms of aluminosilicate or silicate components for which good thermodynamic data is available. These components then become the "building blocks" of the glass structure. The rationale for this approach is based on the observation that in reality, as discussed previously, glass comprising a fiber is much more than a simple mechanical mixture of oxides as represented by the formulae above. It is actually comprised of a complex assemblage of oligomers, each consisting of a network (chains, branched chains, rings) and modifying cations or network modifiers. The choice of the particular building blocks used to best approximate the glass is also based on (a) the ability of these components and their combination to closely model or approximate the degree of polymerization existing within the glass, and (b) the degree to which the combination of these components can match the measured density or molar volume of the glass comprising the fiber. Once these new structural-chemical units have been chosen, the glass composition may be recalculated using these components instead of the simple oxides. The calculation procedure is conventionally known as a normative calculation and follows some simple rules for compositional assignments. First of all, all of the $Al_2O_3$ in the composition is allotted to the alkali feldspar components, $KAlSi_3O_8$, and $NaAlSi_3O_8$ with the first preference given to the potassium component, consistent with its greater thermodynamic stability and the lower electronegativity of the potassium ion. If all of the alkali is consumed by this procedure, then the alkaline earth feldspar $CaAl_2Si_2O_8$ is constructed. If all alumina is consumed in the first operation and alkali leftover, it is allotted to the metasilicate components e.g., $Na_2SiO_3$ or $K_2SiO_3$ as used in the Paul model. All alkaline earth oxides (including residual CaO) and divalent transition metal oxides are assigned to metasilicate (pyroxene, or pyroxenoid) components—e.g., $MgSiO_3$, $CaSiO_3$, etc. Lithophilic tri- and tetravalent transition metal oxides are cast as silicates if good thermodynamic data is available (e.g., $ZrSiO_4$); others are left as the oxides. Any residual silica remains as $SiO_2$. In sub-silicic systems, the respective orthosilicate phases are constructed. Boron may be accounted for either by leaving it as a separate $B_2O_3$ component or by combining it with other components, such as alkalis or alkaline earths. Although the net result was not greatly different, in the calculation used here, with the obvious exception of alkali-deficient glasses such as E, boron was allotted to $Na_2B_4O_7$ to reflect the weight of structural chemical evidence based on analogous glass systems. Here the sodium was allocated to the borate phase prior to incorporation as the metasilicate. The procedure is similar to that outlined in Paul (1977;1982), Jantzen and Plodinec (1984) and in Bourcier (1990), although the choice of components, particularly reflecting the allotment of alumina, is different here for reasons given above. In the case of the six fibers above, they may then be represented as follows:

TABLE 3

| | (mole percent component) | | | | | |
|---|---|---|---|---|---|---|
| | 1 | 2 | 3 | 5X | 6X | 7X |
| $SiO_2$ | 34.1 | 47.6 | 36.2 | 48.3 | 47.4 | 59.9 |
| $NaAlSi_3O_8$ | 9.3 | 7.8 | 6.0 | 0.9 | — | — |
| $KAlSi_3O_8$ | 2.9 | 2.6 | 1.9 | 2.6 | 3.6 | 3.1 |
| $CaSiO_3$ | 16.3 | 9.87 | 23.5 | 18.2 | 18.7 | 15.2 |

TABLE 3-continued

| | (mole percent component) | | | | | |
|---|---|---|---|---|---|---|
| | 1 | 2 | 3 | 5X | 6X | 7X |
| $MgSiO_3$ | 12.5 | 8.0 | 1.3 | 6.6 | 6.7 | 4.7 |
| $BaSiO_3$ | — | — | — | — | 1.3 | — |
| $ZnSiO_3$ | — | — | 2.3 | — | — | — |
| $Na_2SiO_3$ | 17.2 | 20.0 | 20.3 | 14.1 | 12.6 | 8.5 |
| $Na_2B_4O_7$ | 7.7 | 4.2 | 8.5 | 7.3 | 7.5 | 8.4 |
| $ZrSiO_4$ | — | — | — | 2.0 | 2.0 | 0.2 |

Thermodynamic data, including molar volume, free energy of formation, and enthalpy of formation are available for each of the above components, although not always for the quenched glass which would be the most useful. Instead, data for the crystalline varieties of each component must be used. It is desirable, however, to obtain the data from the crystalline form stable in equilibrium with the melt at 1 atmosphere pressure—i.e., that which is stable at the liquidus temperature. This is typically the lowest density form and one which gives a somewhat closer approximation to the component as a glass. Mixing of the components in proper proportion then gives an overall approximation of the particular thermodynamic state of the multicomponent glass in question.

For example, molar volume of the above glasses comprising each fiber may be calculated as:

$$V_{m,gl} = \Sigma X_i V_{m,i}$$

where $V_{m,gl}$ represents the overall molar volume of the glass, $V_{m,i}$ the molar volume of each component, and $X_i$ the mole fraction of each component in the total glass composition. For examples 1 through 6 above, calculated and measured molar volumes are given as follows:

| Fiber | Vm calc. | Vm actual |
|---|---|---|
| 1 | 23.816 | 23.685 |
| 2 | 24.504 | 24.146 |
| 3 | 24.793 | 24.069 |
| 5X | 24.479 | 23.634 |
| 6X | 24.623 | 23.847 |
| 7X | 25.234 | 24.084 |

In the examples above, calculated molar volumes were found to lie within 5% of those determined by actual measurement—indicating the model to be a reasonable approximation to the glass comprising the fibers. The enthalpy or heat of formation may then be calculated in a likewise fashion by summing all of the enthalpies of each component of the glass weighted by the mole fraction of that component in the formulation, or $$\Delta H_f(\text{glass}) = \Sigma X_i \Delta H_{f,i}^o$$

Thermodynamic data useful for calculation of enthalpies of formation for the various components may be obtained from published data given by Paul (1977, 1982), Robie et al. (1978), Pankratz et al. (1984), Cox et al. (1989), and Wagman et al. (1982).

Enthalpies of formation provide a measure of internal bond strength which must be overcome in the dissolution of a glass by either water (moisture) or biological fluids. For the examples given above, calculated enthalpies of formation are as follows:

| Fiber | ΔH (formation) (kcal/mole) |
|---|---|
| 1 | −209.7 |
| 2 | −208.3 |
| 3 | −211.4 |
| 5X | −211.7 |
| 6X | −212.5 |
| 7X | −215.3 |

In the case of dissolution by water (moisture), it was found that, in general, desirable properties (strength and resistance to moisture attack) were achieved by those compositions with enthalpies of formation equal to or less than (more negative than) that for glass fiber 1, i.e. less than (more negative than) −210.0 kcal/mole.

While preferred materials and processes have been described, listed below is a description of preferred embodiments where all parts are parts by weight and all degrees are degrees Centigrade, unless otherwise indicated.

EXAMPLE 1

A number of glass fiber compositions were prepared and their biodissolution rates calculated. The simulated extra cellular fluid that was utilized is a Gambles solution having the composition reflected below:

| Component | Gambles Variation |
|---|---|
| Inorganic Salts | |
| $Na^+$ | 147.5 |
| $K^+$ | 4.2 |
| $Mg^{2+}$ | 0.8 |
| $Ca^{2+}$ | 0.4 |
| $Cl^-$ | 112.2 |
| $HPO_4^{2-}$ | 1.0 |
| $HCO_3^-$ | 23.2 |
| $SO_4^{2-}$ | 0.5 |
| Carboxylic Acids | |
| Acetate | 0.8 |
| Biocides | |
| Azide | 7.7 |
| pH | 7.5 (.05 atm. $CO_2$) |

The most useful fibers are those which show the highest rates of dissolution in physiological media but have the greatest resistance to moisture. The latter can be estimated from the overall free energy of hydration of the glass, which in turn, can be calculated from the specific hydration energies of each of the components. One needs only to know the mole fraction of each component in the glass and the most likely reaction (hydration) products to be formed upon reaction with water under ambient conditions.

With allowance made for some different choices in components, choice of specific hydration products (eq. 2) pretty much follows that of Paul (1977, 1982) and Jantzen and Plodinec (1984) for dissolution of glasses at near neutral pH conditions. These products include amorphous components of the glass leached layer and solvated aqueous cations. This is consistent with known behavior of glass fiber in various leaching experiments, including those discussed later. Further support was obtained from published Pourbaix diagrams (e.g., Garrels and Christ, 1965) which provide stability fields for aqueous species of interest. A summation is given in Table 4.

TABLE 4

Component hydration reactions and their corresponding free energies.

| Glass Component | Hydration products | ΔG° hydration (kcal/mol) |
|---|---|---|
| $SiO_2$ | $H_2SiO_3$ | 3.76 |
| $TiO_2$ | $TiO(OH)_2$ | 15.99 |
| $Fe_2O_3$ | $Fe(OH)_3$ | 15.50 |
| $B_2O_3$ | $H_3BO_3$ | −7.61 |
| $P_2O_5$ | $H_3PO_4$ (diss.) | −35.40 |
| $ZrSiO_4$ | $ZrO(OH)^+ + HSiO_3^-$ | 45.10 |
| $CaSiO_3$ | $Ca^{2+}$(aq.) + $H_2SiO_3$ | −17.49 |
| $MgSiO_3$ | $Mg^{+2}$(aq.) + $H_2SiO_3$ | −13.44 |
| $BaSiO_3$ | $Ba^{2+}$(aq.) + $H_2SiO_3$ | −20.05 |
| $FeSiO_3$ | $Fe^{2+}$(aq.) + $H_2SiO_3$ | −14.61 |
| $ZnSiO_3$ | $Zn(OH)_2$(am.) + $H_2SiO_3$ | 14.33 |
| $Na_2SiO_3$ | $Na^+$(aq.) + $H_2SiO_3$ | −30.23 |
| $K_2SiO_3$ | $K^+$(aq.) + $H_2SiO_3$ | −41.28 |
| $NaAlSi_3O_8$ | $Na^+$(aq.) + $Al(OH_3$(am) + $2SiO_3$ | 16.28 |
| $KAlSi_3O_8$ | $K^+$(aq) + $Al(OH)_3$(am) + $H_2SiO_3$ | 18.06 |
| $CaAl_2Si_2O_8$ | $Ca^{2+}$(aq) + $Al(OH)_3$(am) + $H_2SiO_3$ | −0.83 |
| $Na_2B_4O_7$ | $Na^+$(aq) + $H_3BO_3$ | −26.87 |

Once the specific component hydration energies are determined, an overall hydration energy for each glass composition was calculated by weighting with component mole fractions as in the calculation for enthalpy of formation as given above. One final step was taken at this point—the inclusion of a term reflecting the molar free energy of mixing, $\Delta G_m$, associated with the combination of the components of the model to form a homogeneous glass. Strictly speaking, this term needs to be included in an overall calculation of free energy of formation for each glass, however, in this study, it was more convenient to add the term to the overall calculation of ΔG (hydration). Thus, equation (3) becomes $$\Delta G(\text{hydration, glass}) = \Sigma \Delta G°(\text{hydr.})_i X_i + RT\Sigma X_i \ln X_i \quad (5)$$

where the latter term represents an estimate of the free energy of mixing based on an ideal solution model. Actually the term accurately represents only the entropy of mixing ($\Delta S_m$), which is the primary contributor to $\Delta G_m$—the enthalpy term considered negligible (see e.g., Bourcier, 1990). More complicated mixing models have been used (largely without strong support from experimental results), however for the purposes of this work, where relative distinctions are far more important than actual values, use of such models was not deemed justified. Notice that the net effect of the inclusion of this term is to increase the apparent stabilization of the reaction products in equation (1). As such it will not significantly affect the relative hydration energies of glasses with the same or similar number of components; it will, however, impact comparisons between typical multicomponent man made vitreous fiber (MMVF) and those with only a few components.

Free energies of hydration provide a measure of the energy required to break chemical bonds within the glass and that recovered in the formation new bonds with water or various aqueous species; this must occur in the dissolution of a glass by either water (moisture) or biological fluids. For the examples given above calculated free energies of hydration are as follows:

| Fiber | ΔG (hydration) (kcal/mole) |
|---|---|
| 1 | −4.95 |
| 2 | −4.29 |
| 3 | −5.83 |
| 5X | −4.94 |
| 6X | −4.84 |
| 7X | −4.13 |

In the case of dissolution by water (moisture), it was found that, in general, desirable properties (resistance to moisture attack) were achieved by those compositions with free energies of hydration equal to or greater than (more positive than) that for glass fiber 1, i.e. greater than (more positive than) −5.00 kcal/mole.

The glass fibers used for this study were prepared by melting and fiberizing over 60 compositions in a laboratory crucible and pulling through a single hole bushing. Fiber diameters were fixed at 4.5±0.2 μm. Approximately 3 grams of fiber were made available for each composition. In addition, densities, high temperature viscosities, and liquidus temperatures were measured as well.

The glass fiber compositions that were studied for evaluation of their biosolubility or biodissolution properties were the same as those for which enthalpies of formation and free energies of hydration were calculated. They lay within the following range:

| | (in mole % oxide) |
|---|---|
| $SiO_2$ | 58–68 |
| $Al_2O_3$ | 0–4 |
| $Fe_2O_3$ | 0–3 |
| $TiO_2$ | 0–2 |
| $ZrO_2$ | 0–3.5 |
| CaO | 0–21 |
| MgO | 0–13 |
| BaO | 0–2.5 |
| ZnO | 0–3.5 |
| $Na_2O$ | 8–18 |
| $K_2O$ | 0–2.5 |
| $Li_2O$ | 0–2 |
| $B_2O_3$ | 4.5–11 |
| $P_2O_5$ | 0–1.5 |
| $F_2$ | 0–1.5 |

The procedure used to evaluate biodissolution rate ("biosolubility") was similar to that described in Law et. al. (1990). The procedure consists essentially of leaching a 0.5 gram aliquant of the candidate fibers in a synthetic physiological fluid, known as Gamble's fluid (shown above), or synthetic extracellular fluid (SEF) at a temperature of 37° C. and a rate of 5 ml. per hour for a period of up to 1,000 hours duration. Fibers are held in a thin layer between 0.2 μm polycarbonate filter media backed by plastic support mesh and the entire assembly placed within a polycarbonate sample cell through which the fluid could be percolated. Each sample cell was gently shaken (mechanically) throughout the duration of the experiment to insure adequate permeation of the fluid through the fibers. Fluid pH was regulated to 7.4+0.1 through use of positive pressure of 5% CO2/95% N2 throughout the flow system.

Elemental analysis (using inductively coupled plasma spectroscopy—ICP) of fluid samples taken at specific time intervals were used to calculate the total mass of glass dissolved. From this data, an overall rate constant could be calculated for each fiber type from the relation:

$$K = [d_o \rho (1 - (M/M_o)^{\frac{1}{2}})]/2t$$

where K is the dissolution rate constant in (SEF), $d_o$ the initial fiber diameter, $\rho$ the initial density of the glass comprising the fiber, $M_o$ the initial mass of the fibers, M the final mass of the fibers ($M/M_o$=the mass fraction remaining), and t the time over which the data was taken. Details of the derivation of this relation is given in Leineweber (1982) and Potter and Mattson (1991).

Values for K are reported in ng/cm² hr. and ranged from values of 50 to 1000. Replicate runs on several fibers in the sample set showed that K values were consistent to within 3 percent for a given composition.

Data obtained from this evaluation can be effectively correlated within the sample set chosen—dissolution data used to derive K's were obtained only from experimental samples of uniform (4.5 μm) diameter and under identical conditions of flow rate, initial surface area per volume of fluid per unit time, and sample permeability. Furthermore, data was obtained from relatively short-term extractions (maximum of 166 hours) where dissolution kinetics were linear, or approximately so, and unconfounded by diffusion-limiting conditions, e.g. through the development of extensive leached layers on the fiber surfaces.

Test results for biodissolution are indicated in the Table below:

| Commercial formulations | K (ng/cm2 hr) |
|---|---|
| 1 | 540 |
| 2 | 180 |
| 3 | 290 |
| Fibers with desirable "biosoluble" properties | |
| 5X | 800 |
| 6X | 870 |
| 7X | 990 |

As seen here, new "biosoluble" fibers show at least a 50% increase in dissolution rate constant as compared with current commercial fibers. Desirable formulations are those with a K of at least 750 ng/cm² hr.

In addition to the above evaluations, samples of other commercially-available glass fibers were also obtained and analyzed to determine their compositions (Table 5). These samples all contained fibers which were below 4.5 micrometers in diameter and therefore, potentially respirable to humans. Single fibers based on the analyzed compositions were then prepared according to the methods described above and analyzed to determine their biodissolution rates. Free energies of hydration and enthalpies of formation were also calculated. The results of these evaluations are given in Table 6.

TABLE 5

| | (mole per cent oxide) | | | | |
|---|---|---|---|---|---|
| | Fiber | | | | |
| | 4 | 5 | 6 | 7 | 8 |
| $SiO_2$ | 62.8 | 64.8 | 65.4 | 56.9 | 59.8 |
| $Al_2O_3$ | 3.7 | 2.3 | 2.1 | 8.8 | — |
| CaO | 3.1 | 8.0 | 6.5 | 21.3 | 17.4 |
| MgO | 0.7 | 4.2 | 4.1 | 3.9 | 4.7 |
| BaO | 2.2 | — | — | — | — |
| ZnO | 3.4 | — | — | — | — |
| $Na_2O$ | 11.3 | 15.6 | 15.3 | 0.6 | 14.7 |
| $K_2O$ | 1.9 | 0.9 | 0.5 | 0.1 | 0.4 |
| $B_2O_3$ | 9.8 | 3.9 | 4.6 | 7.4 | 2.8 |

TABLE 5-continued

| | (mole per cent oxide) | | | | |
|---|---|---|---|---|---|
| | | Fiber | | | |
| | 4 | 5 | 6 | 7 | 8 |
| $F_2$ | 1.1 | 0.2 | 1.0 | 0.5 | — |
| impurities | — | 0.1 | 0.5 | 0.5 | — |

TABLE 6

| Fiber | K (ng/cm2hr) | ΔG (hydration) (kcal/mol) | ΔH (formation) (kcal/mol) |
|---|---|---|---|
| 4 | 46 | −1.80 | −214.9 |
| 5 | 300 | −5.13 | −207.7 |
| 6 | 124 | −4.67 | −205.3 |
| 7 | 7 | −2.30 | −225.9 |
| 8 | 1300 | −7.97 | −199.2 |

Of the above fibers, only fiber 8 exhibits a desirable high biodissolution rate, in excess of 750 ng/cm2 hr. However, both the enthalpy of formation and free energy of hydration for this composition lie outside of the range found most desirable for adequate moisture resistance.

EXAMPLE 2

Moisture resistance of fibers was also assessed experimentally using two separate procedures:

In the first method, candidate compositions were electrically melted and centrifugally fiberized to produce batts of several inch thickness with bulk densities of around 0.75 pound per cubic foot. Mean diameters of the fibers comprising these batts were kept close to 3 micrometers to approximate that seen in many actual insulation products. Samples from each of the batts were then fogged with commercially available phenolic binder and cured in an oven at 450° F. for ten minutes to achieve an LOI of 6% by weight. The resulting bonded material closely resembled actual product in both form and in most physical properties.

Several six by six inch cuts were made from each bonded product and compressed between plates to 25% of their original thickness. Compressed samples were then placed in a chamber held at 68° C. and 90% relative humidity and held for periods of up to one week. Periodically, samples were removed from the chamber, cooled to room temperature and decompressed. The expansion (recovery) of the batt was measured as a percent of original thickness. Samples were then recompressed and returned to the humidity chamber and the cycle repeated at successive time intervals until testing was completed. Loss in recovery for each candidate fiber composition was then determined as a function of time of exposure to the temperature and humidity (moisture) conditions above. Normalizations relative to both fiber diameter and sample weight were also performed.

Since samples of fiber with known (acceptable) performance characteristics under stress-humidity conditions were also included in the study, results for all candidate fibers could be compared and also extrapolated to probable performance in actual product form. These "marker" fibers were produced by the same process described above., but using glass formulations equivalent to that of fiber comprising current commercial product (but without the desirable biodissolution properties claimed above). The results revealed that, of those fiber compositions with desirable biodissolution properties, only ones with calculated enthalpies of formation less than (more negative than) −210.0 kcal/mole and calculated free energies of hydration greater than (more positive than) −5.00 kcal/mole had sufficient moisture resistance to perform well in actual product application—i.e., the degradation in their measured recoveries was equal to or less than that of current commercial (acceptable) fiber products, measured at 0.67% to 0.75% per hour in this particular test.

The second method used to assess moisture resistance and likely behavior in product application was a simple fiber bending fatigue test, using single filaments of candidate fibers. In this method, candidate compositions were cast into strands of single filaments using procedures identical to those described above for the preparation of fibers used in the determination of biodissolution rates. Thin strands of fiber were then bent around wire mandrels through known radii of curvature to fixed elastic bending strains and placed in a chamber under the same temperature-humidity conditions used above for periods of up to one week. General procedures follow those described in France et. al (1983). Elastic bending strains employed ranged between 0.4% and 2%—well below that required for failure (fracture) at room temperature under dry conditions. Samples were monitored periodically to determine (a) time to initial fracture, and (b) median time to failure under the stress-moisture conditions noted above. Again the same "marker" fiber compositions were used for direct comparison.

Results again showed that only those fibers with calculated enthalpies of formation less than (more negative than) −210.0 kcal/mole and calculated free energies of hydration greater than (more positive than) −5.00 kcal/mole had sufficient moisture resistance to perform as well as the "marker" fibers made from current formulations. Criteria established, based on the performance of the latter were that both initial fracture and median failure times be no less than 14 hours at an elastic bending strain of 1.75%, and no less than 24 hours at an elastic bending strain of 1.00%. Examples 5X, 6X, and 7X noted above are examples of fibers with both high biodissolution properties and sufficient strength and moisture resistance to meet these criteria.

Figure 1:
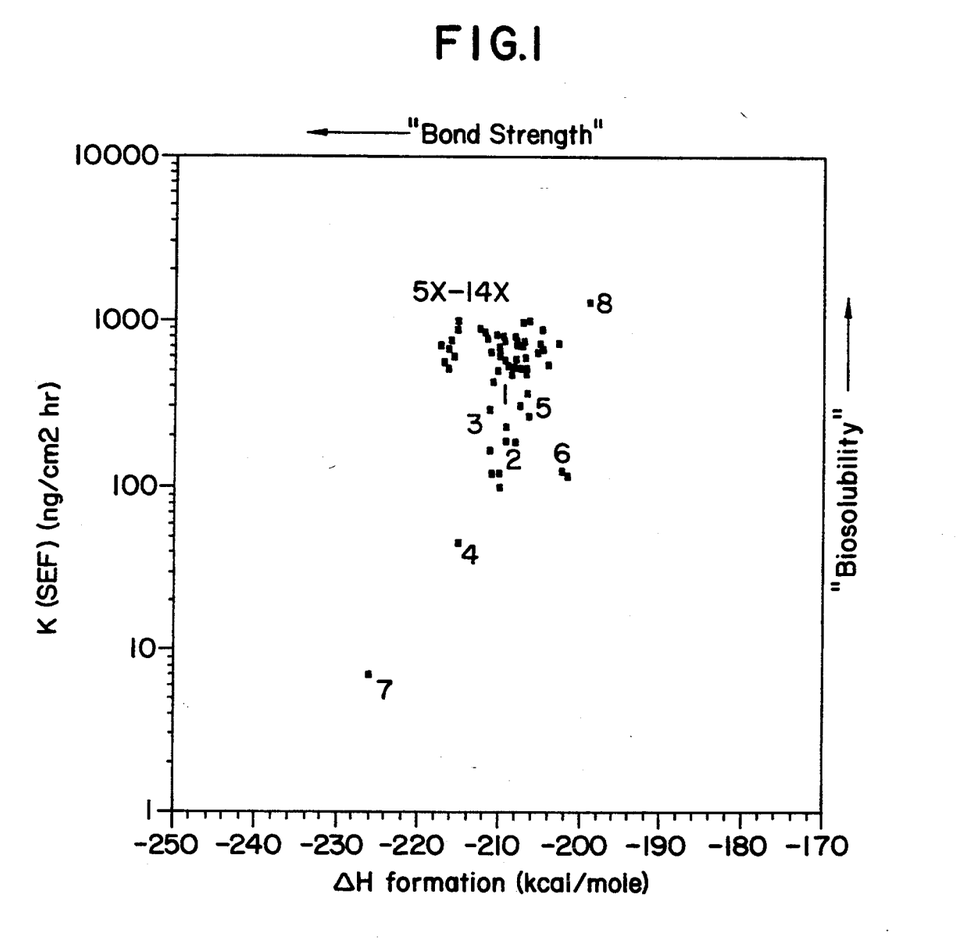
FIG. 1 is a plot along the ordinate axis of the $\Delta H$ (formation) (kcal/mol) and along the absissa, the dissolution rate in simulated extra cellular fluid ($ng/cm^2/hour$) which is comparable to that shown in FIG. 2.
Figure 2:
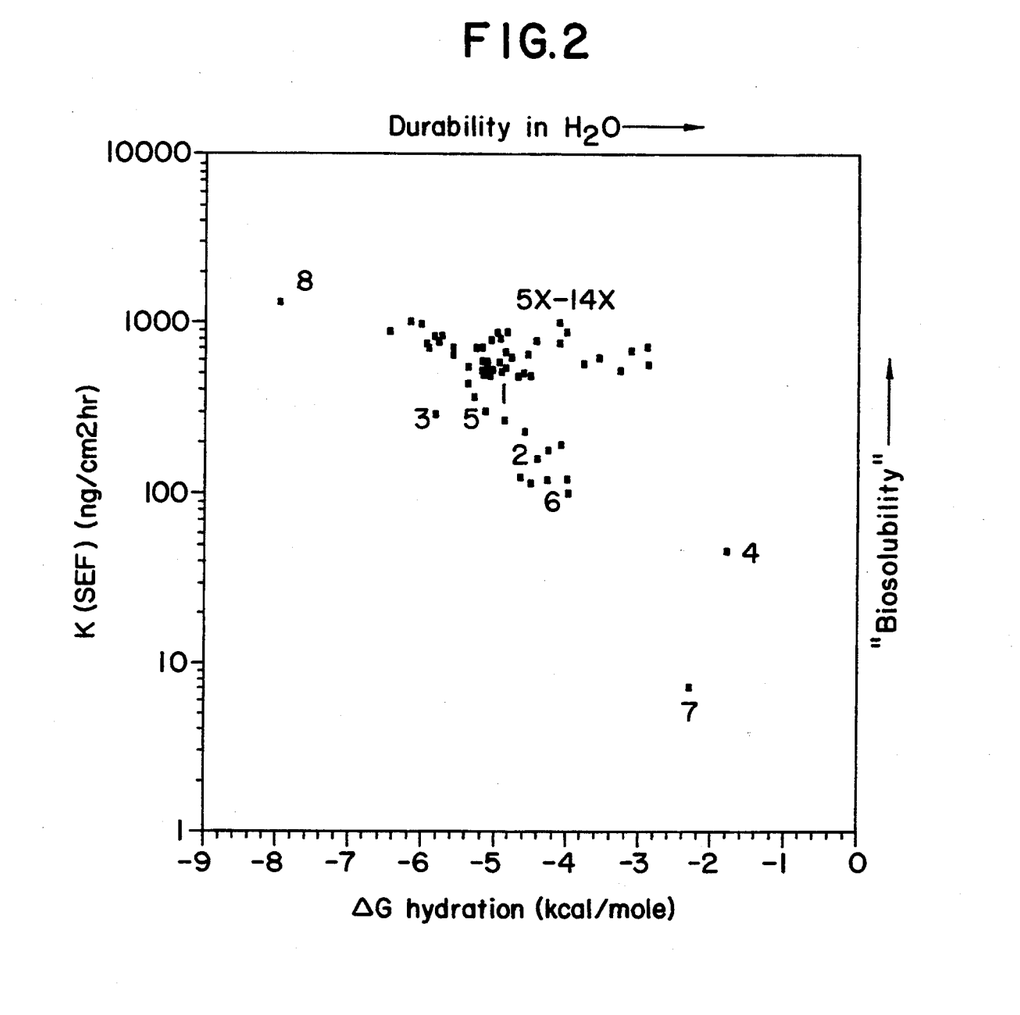
FIG. 2 is a chart plotting, along the ordinate axis, $\Delta G$ (hydration) (kcal/mol) of the formation of fibers and along the absissa, dissolution rate of the fibers in extra cellular fluid ($ng/cm^2/hour$) where the desirable fibers are in the upper right quadrant.

As can be seen from attached FIGS. 1 and 2, only newly-developed compositions within the series 5X through 7X and 12X through 14X have not only the high biosolubility but also appropriate bond strength, namely more negative than −210.0 kcal/mol and the free energy of hydration more positive than −5.00 kcal/mol.

The compositions 12X–14X are as follows:

| | (in mole % oxide) | | |
|---|---|---|---|
| | 12X | 13X | 14X |
| $SiO_2$ | 63.0 | 63.0 | 63.9 |
| $Al_2O_3$ | 1.0 | 1.5 | 1.2 |
| CaO | 13.5 | 11.9 | 8.0 |
| MgO | — | — | — |
| $Na_2O$ | 10.0 | 11.5 | 15.8 |
| $K_2O$ | 1.0 | 1.0 | 0.3 |
| $B_2O_3$ | 11.0 | 9.0 | 8.7 |
| $ZrO_2$ | 0.5 | 0.1 | 0.1 |

A plot of the data is shown in FIGS. 1 and 2.

FIG. 1 shows a correlation between dissolution rate constant in simulated extracellular fluid (SEF) and standard enthalpy of formation for the glass comprising fibers developed in this study. Values for fiber compositions 1 through 8 in Tables 3 and 5 are indicated together with those for the experimental 5X through 14X series.

FIG. 2 shows a correlation between dissolution rate constant in simulated extracellular fluid (SEF) and free energy of hydration for the glass comprising fibers developed in this study. Plot assumes only those reactions involving hydration of the glass are significant. Values for fiber compositions 1 through 8 in Tables 3 and 5 are indicated together with those for the experimental 5X through 14X series.

REFERENCES

Bourcier, W. L., *Geochemical Modelling of Radioactive Waste Glass Dissolution Using EO3/6*, Lawrence Livermore National Laboratory, UCID—21869 (1990).

Cox, J. D., Wagman, D. D., and Medvedev, V. A., *CODATA Key Values for Thermodynamics* (Hemisphere publishing, New York) (1989).

Garrels, R. M. and Christ, C. L., *Solutions Minerals and Equilibria* (Freeman Cooper, San Francisco) (1982).

Pankratz, L. B., Stuve, J. M. and Gokcen, N. A., *Thermodynamic Data for Mineral Technology, USBM Bulletin* 677 (USBM, Washington) (1984).

Paul, A., *Chemistry of Glasses* (Chapman and Hall, New York) (1982).

Paul, A., *J. Mat. Sci.* 12, pp. 2246–2268 (1977).

Potter, R. M. and Mattson, S. M., *Glastech. Ber.* 64, 16-28 (1991).

Law, B., Bunn, W. B., and Hesterberg, T. W., *Inhalation Toxicology* 2, p. 321-339 (1990).

Leineweber, J. P., In Biological Effects of Man-made Mineral Fibers Proc. WHO/IARC Conf., Copenhagen, Vol. 2, pp. 87-101 WHO—Copenhagen (1984).

Robie, R. A., Hemingway, B. S., and Fisher, J. R., *Thermodynamic Properties of Minerals and Related Substances at 298, 15K and 1 Bar Pressure and at Higher Temperatures USGS Bulletin* 1452 (USGPO, Washington) (1978).

Wagman, D. D., Evans, W. H., Parker, V. B., Schumm, R. H., Bailey, S. M., Halow, I., Churney, K. L., and Nutall, R. L., *NBS Tables Of Chemical Thermodynamic Properties: Selected Values for Inorganic and C1 and C2 Organic Substances in SI Units.* American Chemical Society, Washington (1982).

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. Glass fiber composition comprising an inorganic fiber comprising silicon dioxide, calcium oxide, and alkali oxide having a free energy of hydration greater than (more positive than) −5.00 kcal/mol, a free energy of formation less than (more negative than) −210.0 kcal/mol, a dissolution rate in simulated extra cellular fluid greater than 750 (calculated as nanograms of fiber/per square centimeter of fiber surface area/per hour) and having an average fiber diameter not greater than 4.5 micrometers wherein the composition has the following components:

| | |
|---|---|
| Silicon dioxide | 50–70 mole % |
| Calcium oxide | 3–20 " |
| Alkali oxide | 5–20 " |
| Boron oxide | 3–15 " |
| Zirconia | 0.1–5 mole % |
| | 100% |

2. Glass fiber composition comprising an inorganic fiber comprising silicon dioxide, calcium oxide, and alkali oxide having a free energy of hydration greater than (more positive than) −5.00 kcal/mol, a free energy formation less than (more negative than) −210.0 kcal/mol, a dissolution rate in simulated extra cellular fluid greater than 750 (calculated as nanograms of fiber/per square centimeter of fiber surface area/per hour) and having an average fiber diameter not greater than 4.5 micrometers wherein the composition is comprised of the following components:

| | |
|---|---|
| Silicon dioxide | 55–67 mole % |
| Calcium oxide | 5–13 mole % |
| Alkali oxide | 8–13 mole % |
| Boron oxide | 5–13 mole % |
| Zirconia | 1–2 mole % |
| Aluminum oxide | 0–2 mole % |
| | 100% |

* * * * *